United States Patent
Kong et al.

(10) Patent No.: US 10,442,403 B2
(45) Date of Patent: Oct. 15, 2019

(54) WIPER APPARATUS

(71) Applicants: Hyundai Motor Company, Seoul (KR); Kia Motors Corporation, Seoul (KR); Denso Korea Automotive Corporation, Changwon-si (KR)

(72) Inventors: Nak Kyoung Kong, Seongnam-si (KR); Hyun Sub Kim, Seoul (KR); Jin Hee Lee, Seoul (KR); Bock Cheol Lee, Suwon-si (KR); Young Sub Oh, Suwon-si (KR); Hong Yeon Na, Ansan-si (KR); Young Jin Lee, Uiwang-si (KR)

(73) Assignees: Hyundai Motor Company, Seoul (KR); Kia Motors Corporation, Seoul (KR); Denso Korea Automotive Corporation, Changwon-si (KR)

( * ) Notice: Subject to any disclaimer, the term of this patent is extended or adjusted under 35 U.S.C. 154(b) by 0 days.

(21) Appl. No.: 15/891,624

(22) Filed: Feb. 8, 2018

(65) Prior Publication Data
US 2018/0162325 A1 Jun. 14, 2018

Related U.S. Application Data

(62) Division of application No. 15/133,004, filed on Apr. 19, 2016, now Pat. No. 9,914,434.

(30) Foreign Application Priority Data

Apr. 20, 2015 (KR) .......................... 10-2015-0055289

(51) Int. Cl.
*B60S 1/34* (2006.01)

(52) U.S. Cl.
CPC ........... *B60S 1/3456* (2013.01); *B60S 1/3413* (2013.01); *B60S 1/3429* (2013.01); *B60S 1/3431* (2013.01);
(Continued)

(58) Field of Classification Search
CPC .... B60S 1/3413; B60S 1/3468; B60S 1/3465; B60S 1/3436; B60S 1/3463; B60S 1/34;
(Continued)

(56) References Cited

U.S. PATENT DOCUMENTS 2,260,903 A    10/1941  Horton
2,997,727 A *   8/1961  Ziegler ................. B60S 1/3418
                                                          15/250.34
(Continued)

FOREIGN PATENT DOCUMENTS

DE          2 159 267           6/1973
DE    10 2012 221 672 A1        5/2014
(Continued)

*Primary Examiner* — Gary K. Graham
(74) *Attorney, Agent, or Firm* — Mogan, Lewis & Bockius LLP

(57) ABSTRACT

A wiper apparatus which removes foreign matters from a windshield by rotating by a pivot of a vehicle may include an arm piece connected to one end of an arm retainer to connect a wiper blade, and a coupling portion having a step portion formed to extend along a longitudinal direction so that an upper surface of the arm piece and an upper surface of the arm retainer form a same surface when coupled to correspond to a coupling hole formed in the arm retainer.

1 Claim, 9 Drawing Sheets

(52) U.S. Cl.
CPC ........... *B60S 1/3434* (2013.01); *B60S 1/3468*
(2013.01); *B60S 1/3447* (2013.01)
(58) Field of Classification Search
CPC .... B60S 1/3456; B60S 1/3431; B60S 1/3429;
B60S 1/3434; B60S 1/3447
USPC ..................................... 15/250.351, 250.352
See application file for complete search history.

(56) References Cited

U.S. PATENT DOCUMENTS

| | | | |
|---|---|---|---|
| 4,947,508 A | 8/1990 | Bauer et al. | |
| 5,435,042 A | 7/1995 | Arai et al. | |
| 6,394,688 B1 * | 5/2002 | Kraemer | B60S 1/34 |
| | | | 15/250.19 |
| 2009/0064442 A1 | 3/2009 | Masuda et al. | |
| 2014/0345076 A1 | 11/2014 | Banno | |

FOREIGN PATENT DOCUMENTS

| | | |
|---|---|---|
| EP | 1 452 413 A1 | 9/2004 |
| GB | 2 240 264 A | 7/1991 |
| JP | 2000-344057 A | 12/2000 |
| JP | 2003-500286 A | 1/2003 |
| JP | 2004-249823 A | 9/2004 |
| JP | 2004-352097 A | 12/2004 |
| JP | 2007-522996 A | 8/2007 |
| JP | 2008-195249 A | 8/2008 |
| JP | 2008-213553 A | 9/2008 |
| JP | 2008-213554 A | 9/2008 |
| JP | 2009-45971 A | 3/2009 |
| KR | 10-1276575 B1 | 6/2013 |

* cited by examiner

WIPER APPARATUS

CROSS-REFERENCE TO RELATED APPLICATION

The present application is a Divisional of U.S. patent application Ser. No. 15/133,004, filed Apr. 19, 2016, which claims priority to Korean Patent Application No. 10-2015-0055289, filed on Apr. 20, 2015, the entire contents of which applications are incorporated herein for all purposes by these references.

BACKGROUND OF THE INVENTION

Field of the Invention

The present disclosure relates to a wiper apparatus. More particularly, it relates to a wiper apparatus which has a beautiful appearance while preventing the flow of an arm piece, reduces an amount of inside/outside exposure of a wiper arm, and reduces costs and weight.

Description of Related Art

Generally, a wiper apparatus 15 installed in a vehicle is provided with a wiper blade 20 at one end of a wiper arm 10, and the wiper arm 10 reciprocatively rotates to remove rainwater and foreign matters attached to a windshield 25 of the vehicle and ensure the visual field of the driver.

Here, the wiper arm 10 includes an arm head 13 that is fixed to a shaft of a pivot installed in the vehicle pivot and rotates, and an arm retainer 12 that is connected to one end of the arm head 13 and rotates at a constant angular range along with the arm head 13.

Moreover, the wiper blade 20 is assembled to the other end of portion of the arm retainer 12.

Meanwhile, the arm retainer 12 is rotatably mounted on the arm head 13 so as to be able to replace or repair the wiper blade 20, and an arm piece 11 is provided at the other end of the arm retainer 12 so as to be able to easily replace the wiper blade 20.

However, as shown in FIG. 1A-FIG. 1D, since it has a structure coupled by the press fixing after the arm piece 11 is inserted into the arm retainer 12, an outline step portion occurs due to the thickness of arm retainer 12 that surrounds the outside of arm piece 11.

Therefore, separation occurs in a connecting portion of the arm retainer 12 to which the arm piece 11 is connected, by an external force generated in the windshield 25 with a long-period use by the step portion of the arm piece 11 and the arm retainer 12, and thus, the arm piece 11 moves. Accordingly, there is a problem in which the wiping performance of a wiper blade 20 connected to arm piece 11 is degraded and a noise occurs.

Meanwhile, a spring S1 is provided in the connecting portion between the arm retainer 12 and the arm head 13, and elastic force acts on the arm head 13 in a direction which presses the wiper blade 20 to the windshield 25 of the vehicle.

Here, the elastic force can act in a direction in which the arm retainer 12 is away from the windshield 25 of the vehicle by the spring S1 according to the relative position of the arm retainer 12 and the arm head 13. Such a phenomenon is defined as a Lock-back.

That is, as shown in FIG. 2A and FIG. 2B, the connecting portion between the arm head 13 and the arm retainer 12 is formed so that one hook of the spring S1 is fixed to a rivet b1 of the arm retainer 12 side and the other hook is U-shaped hooked to a rivet c of the arm head 13 side to be able to keep the elastic force when the arm retainer 12 rotates around the rotary shaft a1.

At this time, when the arm retainer 12 goes beyond a neutral shaft CL1 on the connection line between the rotary shaft a and the arm head 13 side rivet c by the elastic restoring force of the spring S1 pulled when rotating the arm retainer 12, the restoring force of the opposite direction is lost, and the lock-back retention force is generated in a travel direction.

In this way, in order that the arm retainer 12 enters a region having the great lock-back retention force through the neutral shaft CL1, it is necessary to connect the arm head 13 side rivet c1 with the spring S1 so that the U-shaped hook H1 rotating together does not interfere with the rotary shaft a1, and it therefore needs to be formed by the U-shaped hook H1.

However, since an interval between the windshield 25 and the U-shaped hook H1 needs to be 7 mm or more due to the shape of the U-shaped hook H1, and the space between the arm retainer 12 and the windshield 25 opens by 17 mm or more, the inside/outside exposure of the wiper apparatus 15 is excessive, which may become a cause of the fault due to rainwater or external factors.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wiper apparatus which prevents the movement of the arm piece and maintains the beautiful appearance, reinforces and improves the appearance exposure and external force vulnerability of the wiper arm, and reduces the manufacturing cost and weight, by applying a coupling structure in which a step portion is removed via interconnection between the arm piece and the arm retainer, and a lock-back structure which minimizes the exposure of the hook via the interconnection between the arm retainer and the arm head.

According to various aspects of the present invention, a wiper apparatus which removes foreign matters from a windshield by rotating by a pivot of a vehicle, may include an arm piece connected to one end of an arm retainer to connect a wiper blade, and a coupling portion having a step portion formed to extend along a longitudinal direction so that an upper surface of the arm piece and an upper surface of the arm retainer form a same surface when coupled to correspond to a coupling hole formed in the arm retainer.

A curling plate may be formed to further extend in a direction of the arm piece side on a lower side of the coupling hole, thereby tightening and further firmly fixing a lower portion of the step portion through a compression process, in a state in which the coupling portion of the arm piece is inserted into the coupling hole of the arm retainer.

An auxiliary coupling hole may be formed through a lower surface of the arm retainer adjacent to the coupling hole, and on a lower surface of the coupling portion, an auxiliary coupling protrusion coupled in response to the auxiliary coupling hole may be formed to prevent the arm piece from being detached from the arm retainer.

A wiper apparatus which removes foreign matters from a windshield by rotating by a pivot of a vehicle, may include as a lock-back device for converting a rotation direction depending on a magnitude of elastic restoring force and lock-back retention force based on an imaginary neutral shaft by applying the elastic restoring force to an arm retainer rotatably coupled to an arm head by a rotary shaft, an elastic hook having a hook, which connects a spring connected to the arm retainer side rivet to the arm head side rivet, hooked at an end so that an overall appearance including the spring is not exposed to a lower outside of the arm retainer.

The elastic hook may be formed by flexibly bending a wire frame into a "U" shape so as to have an elastic force in a left-right direction, and at a tip of the arm head, a catching opening portion to which the elastic hook is detachably coupled by the forced catching may be formed.

On an inside of an inlet side of the catching opening portion, a catching protrusion may be further formed which temporarily restricts movement in a state in which the elastic hook is caught.

By providing the present invention having a configuration as described above, there is an effect which prevents the movement of the arm piece, maintains the beautiful appearance, reinforces and improves the appearance exposure and external forces fragility of the wiper arm, and reduces the manufacturing costs and weight.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
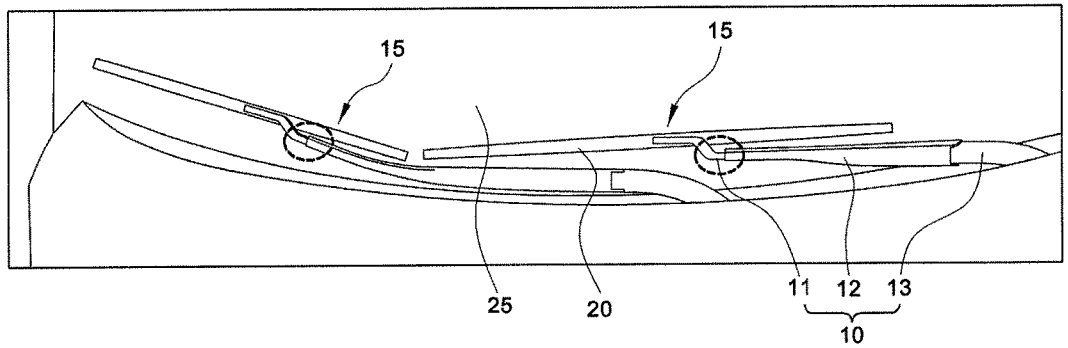
FIG. 1A, FIG. 1B, FIG. 1C, and FIG. 1D are diagrams showing a coupling structure between an arm piece and an arm retainer in a conventional wiper apparatus, wherein the FIG. 1B, FIG. 1C and FIG. 1D show a bottom surface, a top surface, and a side surface of the coupling structure.
Figure 1B:
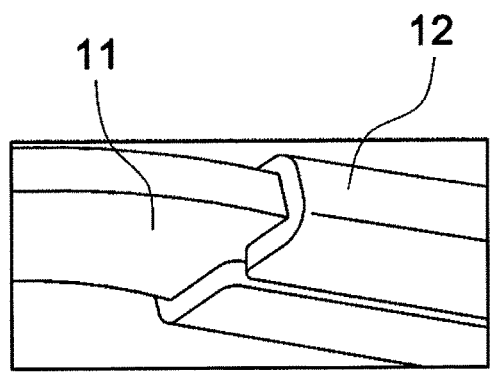
Figure 1C:
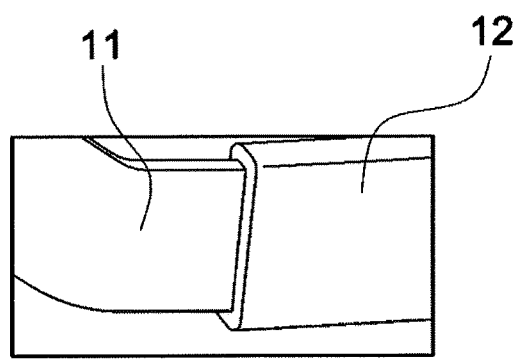
Figure 1D:
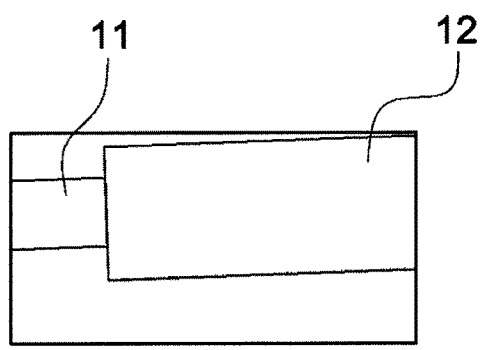
Figure 2A:
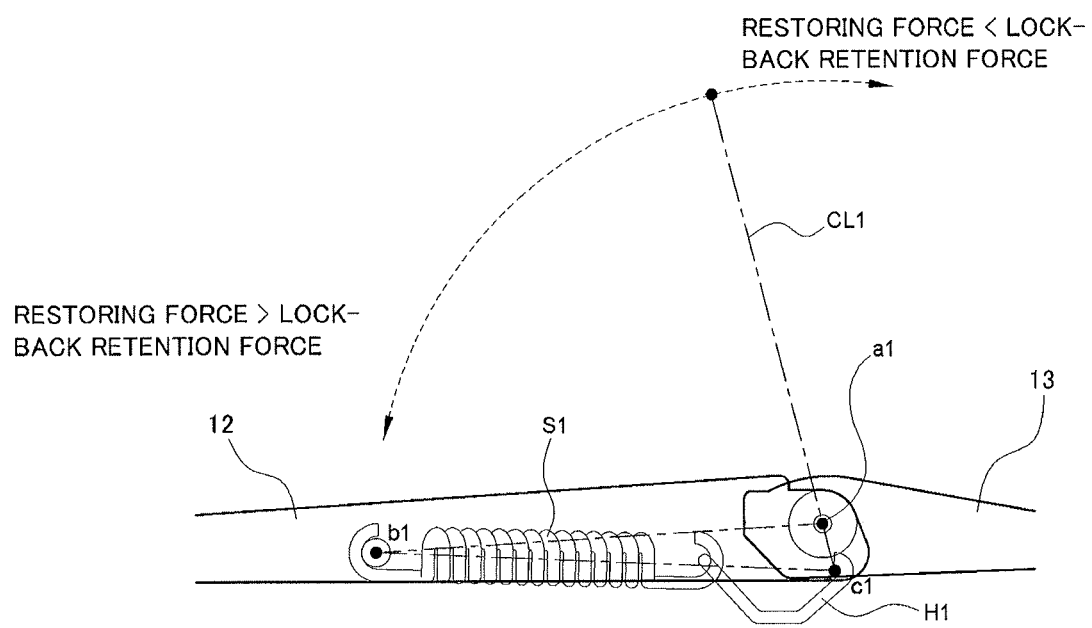
FIG. 2A and FIG. 2B are diagrams showing a lock-back structure of the arm retainer and the arm head in the conventional wiper apparatus.
Figure 2B:
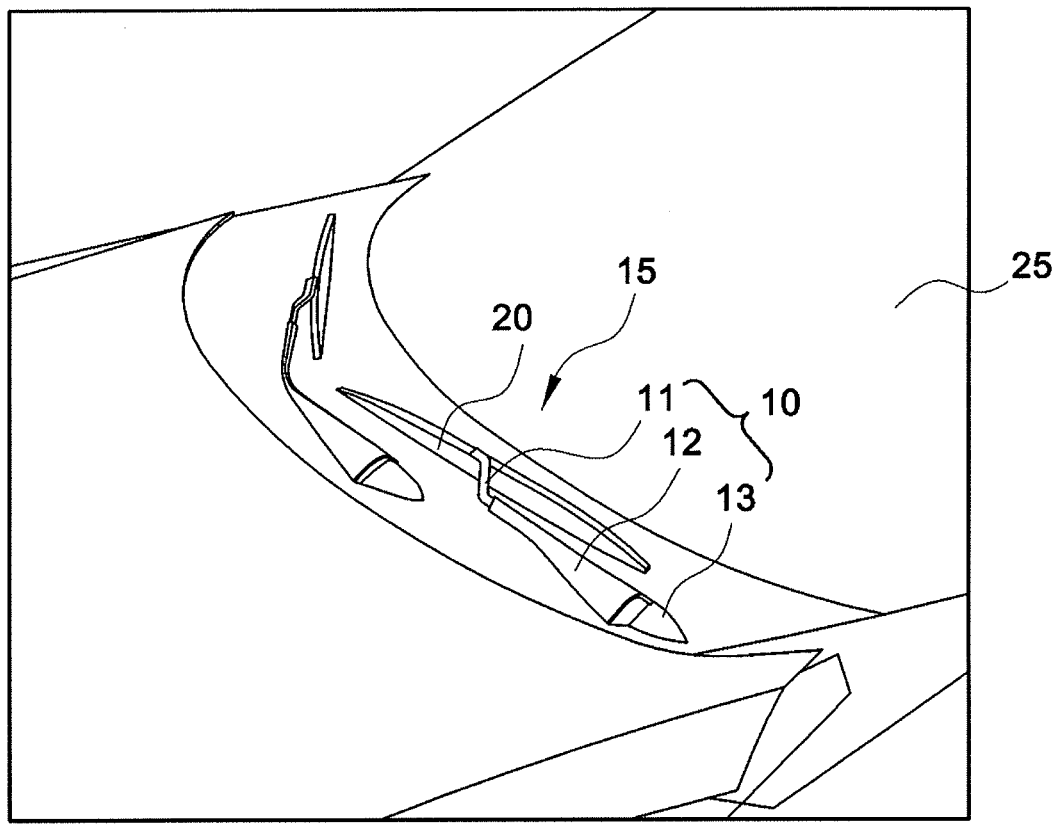

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Typically, the present invention is directed to a wiper apparatus 1 which includes a wiper arm 100 in which an arm head 130, an arm retainer 120 and an arm piece 110 are sequentially connected to a pivot that is adjacent to the windshield 2 and installed in a portion of the vehicle to electrically rotate, and a wiper blade 200 which is connected to the end of the wiper arm 100 and is in close contact with the windshield 2 to remove rainwater and foreign matter from the windshield 2 by the rotation of the wiper arm 100.

Figure 3:
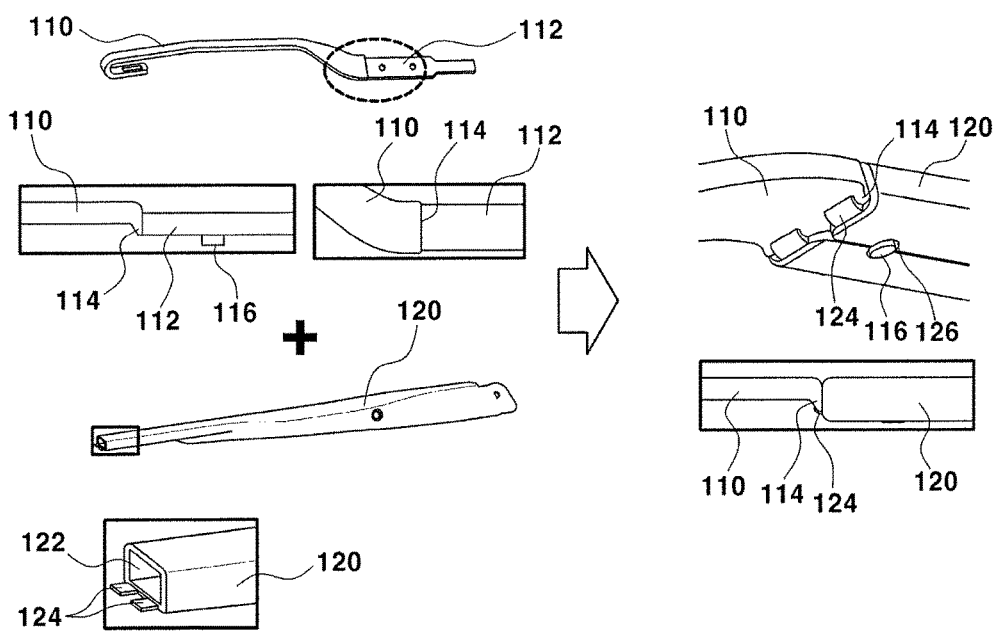
FIG. 3 is a configuration diagram showing a coupling structure of an arm piece and an arm retainer in an exemplary wiper apparatus according to the present invention.

As shown in FIG. 3, in the wiper apparatus 1, the wiper arm 100 is connected to one end of the arm retainer 120 and the arm-piece 110 for connecting the wiper blade 200 is connected.

Here, a coupling portion 112 having a step portion 114 is preferably formed to extend along the longitudinal direction in one portion of the arm piece 110.

Therefore, when the arm piece 110 is correspondingly coupled to the coupling hole 122 formed in the arm retainer 120, the beautiful appearance can be provided so that the upper surface of the arm piece 110 and the upper surface of the arm retainer 120 form the same plane with each other.

At this time, a curling plate 124 is formed to further extend in the direction of the arm piece 110 side on the lower side of the coupling hole 122, thereby tightening and further firmly fixing the lower portion of the step portion 114 through a compression process, in the state in which the coupling portion 112 of the arm piece 110 is inserted into the coupling hole 122 of the arm retainer 120.

That is, when coupling the arm piece 110 to the arm retainer 120, the curling plate 124 is compressed against the step portion 114 side to form a single body, using a separate jig or using a compression press.

Further, an auxiliary coupling hole 126 is formed through the lower surface of the arm retainer 120 adjacent to the coupling hole 122, and on the lower surface of the coupling portion 112, an auxiliary coupling protrusion 116 coupled in response to the auxiliary coupling hole 126 is formed so as to be able to prevent the arm piece 110 from being detached from the arm retainer 120.

Ultimately, primarily, the step portion 114 is firmly held due to the compression of the curling plate 124, and secondarily, it is possible to minimize the movement caused by an external force through the mutual coupling between the auxiliary coupling hole 126 and the auxiliary coupling protrusion 116.

Meanwhile, according to FIG. 4A to FIG. 6, in a portion which connects the arm head 130 and the arm retainer 120 in the wiper arm 100, a lock-back means is provided which converts a rotation direction depending on the magnitude of the elastic restoring force and the lock-back retention force based on the imaginary neutral shaft CL, by applying the elastic restoring force to the arm retainer 120 to the arm head 130 by the rotary shaft a.

The lock-back means connects the spring S having the elastic force with the elastic hook 300 having the hook 320 in series, and is connected to each of the arm retainer 120 and the arm head 130 to give the elastic restoring force to the arm retainer 120.

Therefore, when rotating the arm retainer 120, if it goes beyond based on the virtual natural shaft CL passing through rotary shaft a, the lock-back retention force is stronger than the restoring force, the arm retainer 120 is tilted in the advancing direction, and if it does not lead to natural shaft CL, since the restoring force is more strong, the arm retainer 120 is rotated in the direction of the windshield 2 side.

Figure 4A:
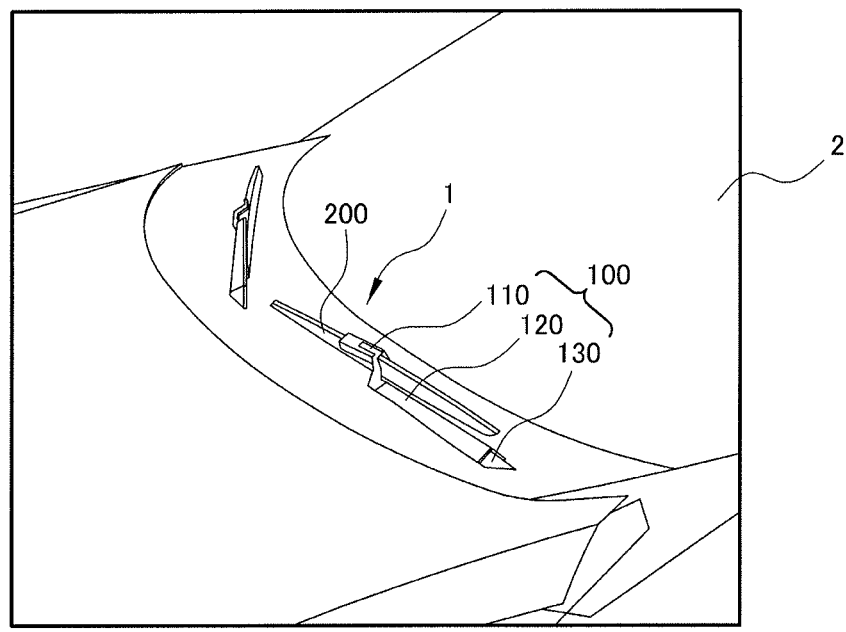
FIG. 4A and FIG. 4B are configuration diagrams showing a lock-back of an arm retainer and an arm head in the exemplary wiper apparatus according to the present invention.
Figure 4B:
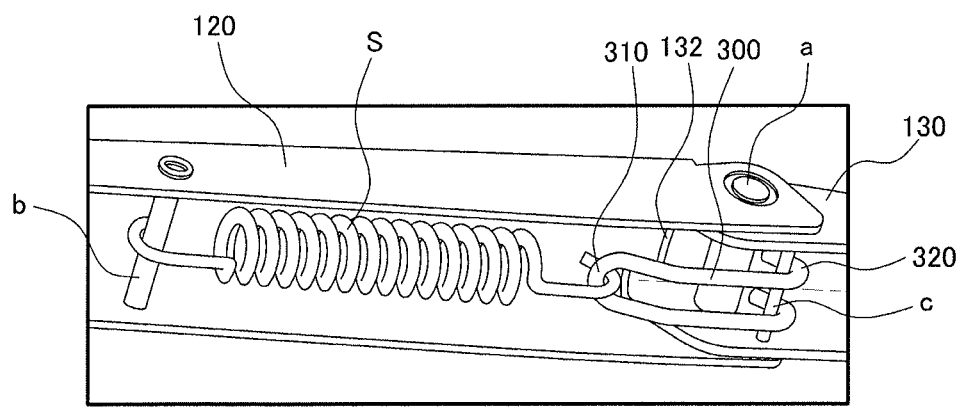

At this time, as shown in FIG. 4, the spring S connected to the arm retainer 120 side rivet b is connected to the arm head 130 side rivet c, and the elastic hook 300 having the hook 320 hooked at the end so as to prevent the overall appearance including the spring S from being exposed to the lower outside of the arm retainer 120 is included.

Therefore, by improving the structure of the lock-back means provided between the arm retainer 120 and the arm head 130, the interval between the windshield 2 and the elastic hook 300 can be applied to 7 mm closer than the related art, and the overall height can be limited to 10 mm.

Figure 5A:
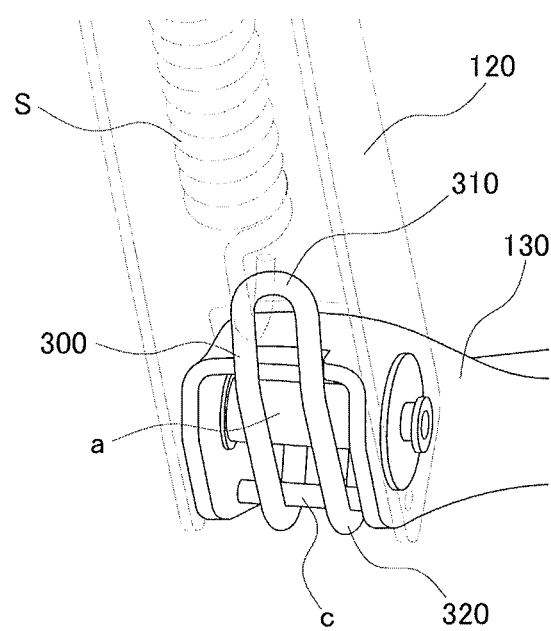
FIG. 5A and FIG. 5B are diagrams showing a disassembled state of lock-back structure in the wiper exemplary apparatus according to the present invention.
Figure 5B:
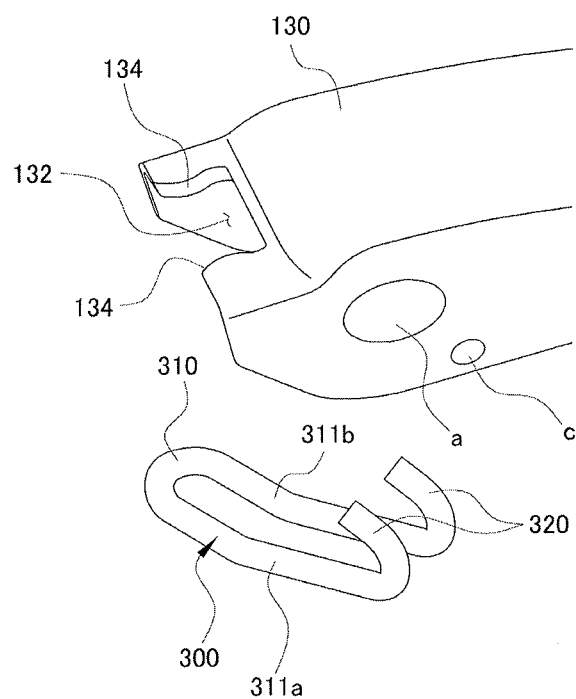

Here, as shown in FIGS. 5A and 5B, the elastic hook 300 has a "U"-shaped wire frame so as to have an elastic force in the left-right directions.

In this case, the elastic hook 300 becomes a catching portion 310 so that a central portion bended to have a shape of "U" can catch one hook of the spring S.

In addition, the hook 320, which is bended to be hooked on the rivet c of the arm head 130, is formed in the ends of a left portion 311a and right portion 311b, which are extended from the catching portion 310.

Furthermore, a catching opening portion 132, which is inserted into the left portion 311a and right portion 311b of the elastic hook 300, is formed in the front end of the arm head 130.

The catching opening portion 132 has a groove so that the left portion 311a and right portion 311b of the elastic hook 300 are inserted, and the left portion 311a and right portion 311b of the elastic hook 300 are inserted into the catching opening portion 132 when the arm retainer 120 makes relative rotation on rotating axis "a."

Accordingly, when the lock-back of he arm retainer 120 is achieved, the elastic hook 300, in which the catching portion 310 is connected to the spring S and the hook 320 is coupled to rivet c, enters the catching portion 132 of the arm head 130. The elastic hook 300 has a spring function, which is stretched in left and right directions.

In this case, the catching portion 132 has a width smaller than a left-right width formed by the left portion 311a and right portion 311b of the elastic hook 300. Therefore, the elastic hook 300 is elastically modified and compressed when the left portion 311a and right portion 311b of the elastic hook 300 go to the inside of the catching portion 132 and then come close to meeting each other.

Moreover, a width of the rear end of the catching portion 132 is relatively wider than that of the front end of the catching portion 132.

When the left portion 311a and right portion 311b of the elastic hook 300 go to the rear end of the catching portion 132, the shape of the elastic hook 300, which is modified and compressed, is restored. The shape is restored in a direction where the left portion 311a and right portion 311b are opened, and then seated in the rear end of the catching portion 132.

In this way, the arm retainer 120 is fixed and prevented from rotating and moving in the opposite direction until a force more than a predetermined level is applied.

In this case, releasing the lock-back is achieved by applying a force more than a predetermined level on the arm retainer 120 so as to be rotated in the opposite direction. When the elastic hook 300 is out of the catching portion 132 of the arm head 130 as the elastic hook 300 is elastically compressed and restored again, the arm retainer 120 returns to the original place.

Referring to FIGS. 5A and 5B, the left and right widths of the rear end of the catching portion 132 are expanded parts, and the front portion of the expanded parts, which is the inside of the inlet of the catching portion 132, comprises a catching protrusion 134, which tentatively restricts a movement of the elastic hook 300 as the left portion 311a and right portion 311b of the elastic hook 300 inserted into rear end are hooked forward.

Figure 6:
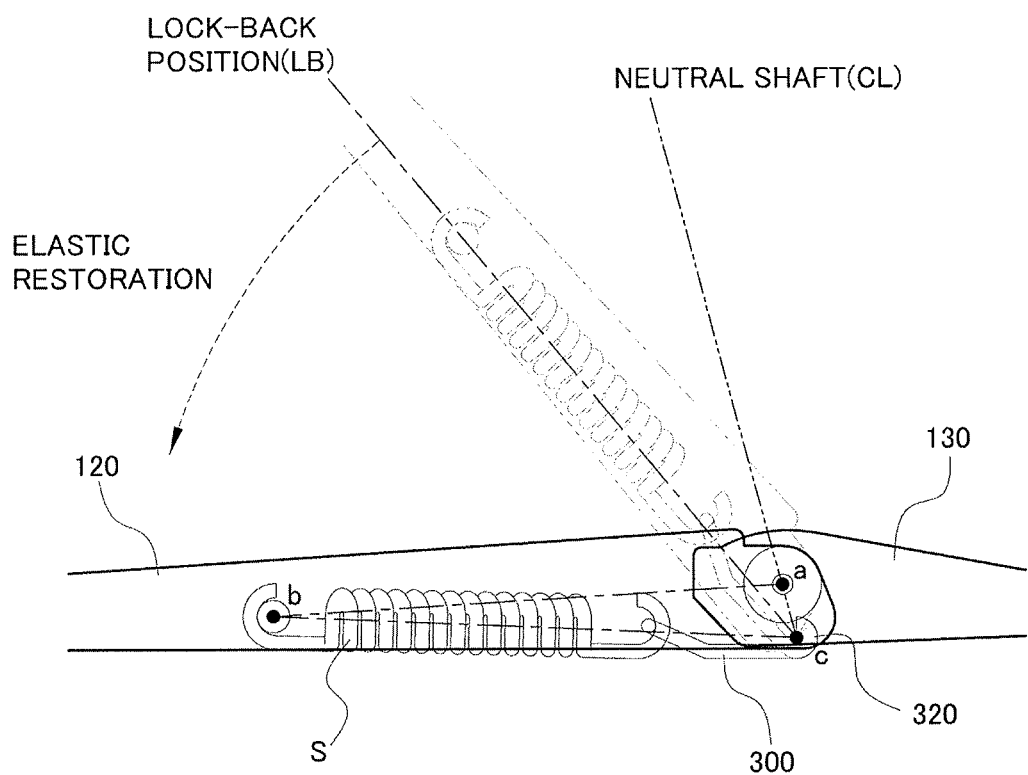
FIG. 6 is a diagram showing an operational state of the lock-back structure in the exemplary wiper apparatus according to the present invention.

In other words, when the arm retainer 120 is rotated in order to change the wiper blade 200, the left portion 311a and right portion 311b of the elastic hook 300 are hooked in the catching portion 132, and then the catching portion 132 supports the elastic hook 300. In this case, as illustrated in FIG. 6, when the left portion 311a and right portion 311b of the elastic hook 300 are inserted into the catching portion 132 and then fixed even before the arm retainer 120 does not reach the position of CL, the lock-back is achieved.

By providing the present invention configured as described above, there are effects in which the movement of arm piece 110 is prevented, the beautiful appearance is maintained, the appearance exposure and the external force fragility of the wiper arm 100 are reinforced and improved, and the manufacturing costs and weight are reduced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiper apparatus which removes foreign matters from a windshield via rotating by a pivot of a vehicle, the wiper apparatus comprising:

an arm piece connected to one end of an arm retainer, said arm piece for connection to a wiper blade,
   wherein a coupling portion of the arm piece has a step portion and is formed to extend along a longitudinal direction so that an upper surface of the arm retainer forms a substantially continuous surface with an upper surface of the arm piece when the coupling portion is inserted into a coupling hole formed in the arm retainer in a longitudinal direction of the arm retainer, and
   wherein a curling plate is formed at the arm retainer to extend from the arm retainer in a direction of the arm piece on a lower side of the coupling hole and contacts and compresses the arm piece, thereby tightening and fixing a lower portion of the step portion through a compression process therebetween, in a state in which the coupling portion of the arm piece is inserted into the coupling hole of the arm retainer;
a U-shape elastic hook having a pair of hook portions at one end thereof, wherein the elastic hook connects a spring, connected to an arm retainer side rivet mounted in the arm retainer, to an arm head side rivet mounted in an arm head, and the hook is hooked to the arm head side rivet at an end of the arm head by the hook portions so that an overall appearance including the spring is not exposed to a lower outside of the arm retainer, the spring generating an elastic restoring force to bias the arm retainer towards the windshield; and
a lock-back device for acting against the elastic restoring force to hold the arm retainer away from the windshield in a lock-back position, the lock-back device having a retention force of a greater magnitude than the elastic restoring force, wherein the lock-back device includes a catching opening formed in an edge of the arm head, an entrance to the catching opening includes protrusions therein that extends towards one another to define a reduce width entrance to the catching opening, and wherein the protrusions engage spaced leg portions of the U-shaped elastic hook in the lock-back positon to retain the U-shaped elastic hook in the catching opening.

* * * * *